(12) United States Patent
Stiesdal

(10) Patent No.: US 8,022,581 B2
(45) Date of Patent: Sep. 20, 2011

(54) STATOR ARRANGEMENT, GENERATOR AND WIND TURBINE

(75) Inventor: Henrik Stiesdal, Odense (DK)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 12/383,960

(22) Filed: Mar. 31, 2009

(65) Prior Publication Data
US 2009/0256431 A1    Oct. 15, 2009

(30) Foreign Application Priority Data
Apr. 10, 2008 (EP) ..................... 08007146

(51) Int. Cl.
H02K 15/12 (2006.01)
H02K 1/04 (2006.01)
H02K 9/00 (2006.01)
H02K 1/06 (2006.01)

(52) U.S. Cl. ........ 310/45; 310/43; 310/52; 310/216.008

(58) Field of Classification Search ............. 310/45, 310/52, 216.08, 43
See application file for complete search history.

(56) References Cited

U.S. PATENT DOCUMENTS

| | | | |
|---|---|---|---|
| 6,445,095 B1 | 9/2002 | Liang et al. | |
| 6,781,276 B1 * | 8/2004 | Stiesdal et al. | 310/254.1 |
| 7,183,665 B2 * | 2/2007 | Bywaters et al. | 290/55 |
| 2002/0089242 A1 | 7/2002 | Liang et al. | |
| 2006/0145548 A1 * | 7/2006 | Wakita | 310/54 |
| 2006/0232143 A1 * | 10/2006 | Purvines et al. | 310/43 |
| 2008/0143199 A1 * | 6/2008 | Laskaris et al. | 310/52 |

FOREIGN PATENT DOCUMENTS

| | | |
|---|---|---|
| DE | 19902837 C1 | 8/2000 |
| EP | 1050946 A2 | 11/2000 |
| EP | 1841043 A1 | 10/2007 |
| JP | 2001119872 A | 4/1927 |
| JP | 59083558 A * | 5/1984 |
| JP | 10014156 A * | 1/1998 |
| JP | 2004208461 A * | 7/2004 |
| WO | WO 91/05953 A1 | 5/1991 |
| WO | WO 00/60719 A1 | 10/2000 |
| WO | WO 03077404 A1 | 9/2003 |
| WO | WO 2007/036505 A1 | 4/2007 |
| WO | WO 2007036505 A1 * | 4/2007 |

OTHER PUBLICATIONS

Machine Translation Wo2007036505 (2007) and JP2004208461 (2004).*
Machine Translation JP10014156 A (1998).*
Ken L. Forsdyke and Trevor F. Starr, Thermoset Resins: Market Report, Rapra Technology Limited, 2002, p. 10.*

* cited by examiner

*Primary Examiner* — Quyen Leung
*Assistant Examiner* — Jose Gonzalez Quinones

(57) ABSTRACT

A stator arrangement of a generator for a wind turbine includes a plurality of stator segments substantially forming the stator of the generator. Each stator segment has at least one stator winding and/or a laminate stack of sheets wherein each stator segment is moulded or casted into a material with an electrical insulating property and/or with a non-corroding quality and/or with a heat conductive property. The direct drive generator is also provided having such a stator arrangement and a wind turbine is provided having such a direct drive generator.

18 Claims, 3 Drawing Sheets

STATOR ARRANGEMENT, GENERATOR AND WIND TURBINE

CROSS REFERENCE TO RELATED APPLICATIONS

This application claims priority of European Patent Office application No. 08007146.7 EP filed Apr. 10, 2008, which is incorporated by reference herein in its entirety.

FIELD OF INVENTION

The invention relates to a stator arrangement of a generator for a wind turbine. The invention concerns also a generator, e.g. a direct drive generator for a wind turbine comprising such a stator arrangement as well as a wind turbine comprising such a generator.

BACKGROUND OF INVENTION

Each wind turbine comprises a generator, e.g. a large direct drive generator having a generator stator and a generator rotor for the production of electrical energy. Wind turbines are erected onshore as well as offshore. In particular, when a wind turbine is erected offshore, the wind turbine as a whole, but also the generator is exposed to rough environmental conditions, like humidity, salty particles etc. If not sufficiently protected in particular the stator components of a wind turbine generator are exposed to damages due to corrosion and to an increased risk of electrical faults under such offshore environmental conditions. Consequently, it is generally advisable that such a generator is fully enclosed.

SUMMARY OF INVENTION

However, under certain circumstances it is convenient to arrange a large wind turbine generator so as to be not fully enclosed. An example is when the generator is located in front of the tower between the wind turbine rotor and the tower, thus on the upwind side of the tower. In such a case access to the rotor hub, e.g. for servicing, is best arranged as a pathway through the generator, which obviously collides with the desire to have a totally enclosed generator.

Furthermore, it is advantageous when the generator stator comprises a series of independent stator segments. A segmented stator has the benefit that in case of a fault the respective affected stator segment can be replaced at a fraction of the costs and effort required for the replacement of the complete stator. However, during the transportation and the handling of the individual stator segments, e.g. in the course of the erection of the wind turbine, the stator segments are exposed to humid and salty ambient conditions which may cause a damage of single stator segments.

It is therefore an object of the present invention to provide a stator arrangement, a generator as well as a wind turbine as initially mentioned in such a way, that a damage of a stator arrangement due to rough ambient conditions is preferably able to be avoided.

This object is inventively achieved by a stator arrangement or a stator of a preferably direct drive generator for a wind turbine comprising a plurality of stator segments forming substantially the stator of the generator, wherein each stator segment has at least one stator winding and/or a laminate stack of sheets and wherein each stator segment is preferably completely moulded or casted into a material with an electrical insulating property and/or with a non-corroding quality and/or with a heat conductive property. By preferably completely moulding or casting of each stator segment using a mentioned material that has preferably all three mentioned properties the at least one stator winding and/or the laminate stack of sheets and the laminate plates respectively of each stator segment are protected in particular against corrosion, humidity, salty and dusty particles. In this way damages of the stator segments due to rough ambient environmental conditions can be avoided in particular during transportation as well as during handling as well as during operation. As a consequence the lifetime of the stator segments is able to be prolonged.

The design of the stator arrangement or the stator with a plurality of moulded or casted and thus preferably fully protected stator segments allows additionally a not fully enclosed generator, e.g. a not fully enclosed large direct drive generator. Consequently the generator is able to comprise a pathway through the generator that is advantageous for servicing of the wind turbine in particular when the generator is located on the upwind side of the tower of the wind turbine between the wind turbine rotor and the tower.

Further on the modular design of the stator arrangement or the stator with single, individual stator segments allows in the case of a failure of a single stator segment to replace only the single affected stator segment instead of the replacement of the whole stator arrangement, stator or even the whole generator. Thus servicing is further simplified.

Preferably each stator segment is a ring segment shaped segment. Thus when the single ring segment shaped segments are connected with each other on their face sides they form the ring shaped stator arrangement or stator which is typically either arranged around or inside of the generator rotor of the wind turbine generator.

According to a variant of the invention the material with the electrical insulating property and/or with the non-corroding quality and/or with the heat conductive property is a resin, a casting resin, an epoxy resin or an epoxy casting resin. It is also possible to add materials to the resin typically used for cast resin transformers, e.g. silicon dioxide ($SiO_2$) for improving the heat conduction and/or glass fibres for avoiding cracking in the resin. As already mentioned, each stator segment is preferably completely moulded or casted into the respective material to have a full protection of the stator segment against rough ambient environmental conditions.

In a further development of the invention a stator segment comprises means for cooling at least for cooling of the respective stator segment. The means for cooling are preferably provided to keep the moulded or casted stator segment within limits of an operation temperature.

Pursuant to one embodiment of the invention the means for cooling of a stator segment comprises at least one conduit for a cooling medium. Preferably the conduit is a jacket or a pipe, which is integrated in the moulded or casted stator segment. According to a variant of the invention the cooling medium is a cooling gas, a cooling oil or water guided or pumped through the conduit. Thus a stator segment is able to be actively cooled.

According to another embodiment of the invention the means for cooling of a stator segment comprises an external surface of the respective stator segment having a heat dissipation property. In one variant of the invention the external surface is a surface of the moulding or the casting material of the respective stator segment, in particular when the moulding or the casting material has heat conductive property. In another variant of the invention the external surface is a surface of a material having a heat dissipation property and being attached to, e.g. bonded with the moulding or casting material of the respective stator segment. This external surface is able to be a surface of e.g. a metal sheet having comparatively good heat conducting and heat dissipation properties, like aluminium, and being bonded with the moulding or casting material. Also in this way a stator segment is able to be cooled.

According to further embodiment of the invention the means for cooling of a stator segment comprises at least one heat conducting element. Preferably the heat conducting element is arranged adjacent to the stator winding and thus at least partially integrated into the moulding or casting material of the stator segment. According to a variant of the invention the heat conducting element is arranged adjacent to a winding head of a stator winding or extends through the opening of a winding head of a stator winding and leads to a surface of the respective stator segment. Preferably the heat conducting element is an aluminium casting element integrated in the moulding or casting material of the respective stator segment. In this way a direct pathway to a heat sink is provided for the heat present in operation in particular nearby the winding head which does not benefit from the proximity to the heat transfer of the laminate stack.

According to another embodiment of the invention the stator arrangement or stator comprises at least one heat exchanger, wherein the means for cooling of a stator segment is connected to the heat exchanger. It is for example possible that the conduits for a cooling medium of the stator segments, at least one heat exchanger and preferably at least one pump are part of a circulation of the cooling medium for cooling the stator segments and thus the whole stator arrangement or stator.

The object of the present invention is also inventively achieved by a direct drive generator comprising a before described stator arrangement or by a wind turbine comprising a before described stator arrangement or the mentioned direct drive generator.

BRIEF DESCRIPTION OF THE DRAWINGS

The invention will in the following be explained in more detail with reference to the schematic drawings, wherein.

DETAILED DESCRIPTION OF INVENTION

Figure 1:
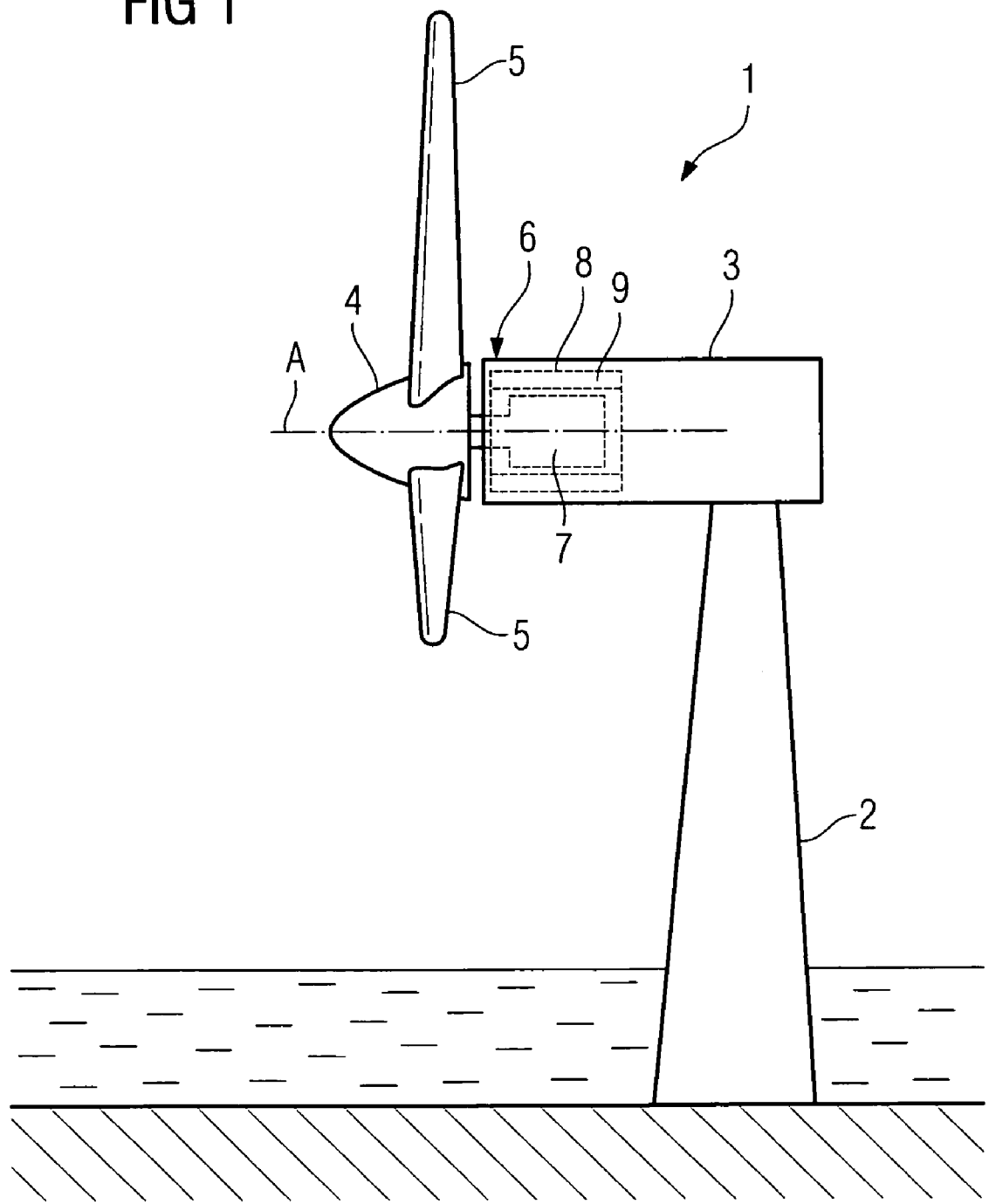
FIG. 1 shows a wind turbine.

FIG. 1 shows a wind turbine 1 comprising a tower 2 erected on a seabed, a nacelle 3 and a hub 4 with rotor blades 5. As schematically indicated in FIG. 1 a generator, in case of the present embodiment of the invention a direct drive generator 6 is arranged in the nacelle 3 between the hub 4 and the tower 2. The direct drive generator 6 comprises a rotor arrangement 7 connected to the hub 4 and a stator arrangement 8 comprising a ring shaped stator 9. The direct drive generator 6 has a substantially horizontally aligned centre axis A.

Figure 2:
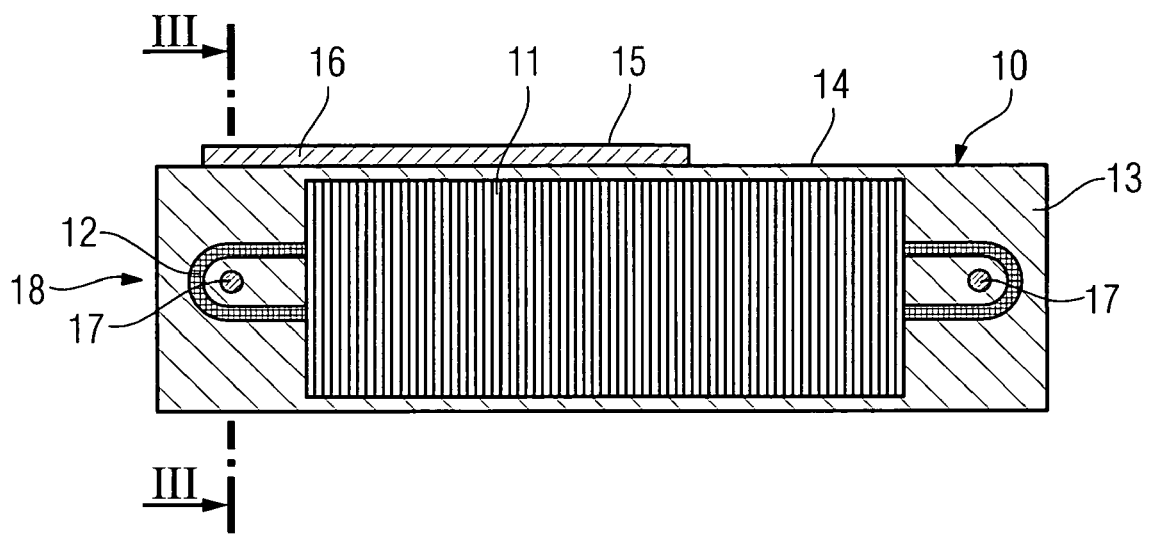
FIG. 2 shows an axial sectional view of a stator segment of a stator of the generator of the wind turbine of FIG. 1.
Figure 3:
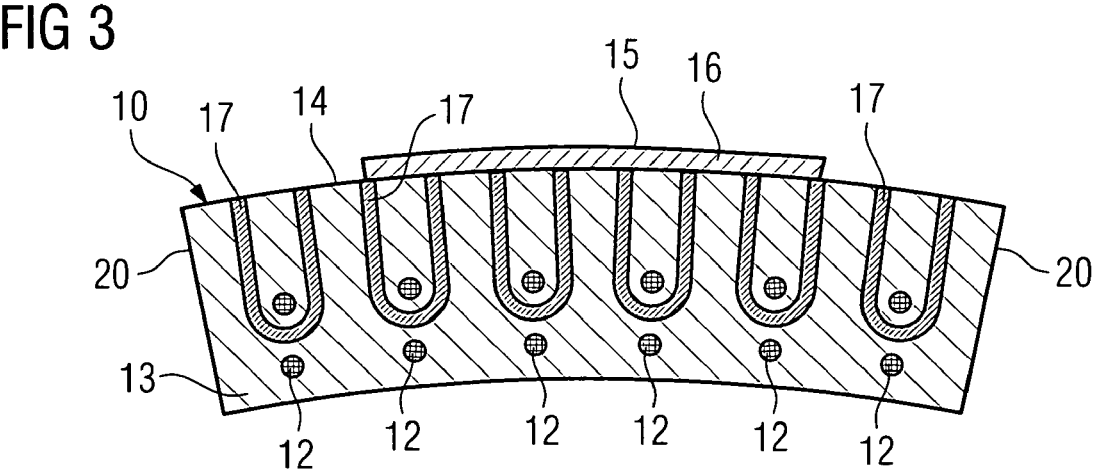
FIG. 3 shows the sectional view of the stator segment of FIG. 2 in the direction of the arrows III.

The ring shaped stator 9 has a modular design and comprises a plurality, e.g. six or less or more ring segment shaped stator segments 10. One of these stator segments 10 is shown in FIG. 2 and FIG. 3 in sectional views.

The illustrated ring segment shaped stator segment 10 comprises in case of the present embodiment of the invention a laminate stack of sheets 11 or a laminated sheet package 11 respectively and stator windings 12 for the generation of electrical energy together with the rotor arrangement 7.

The ring segment shaped stator segment 10 is in case of the present embodiment of the invention completely moulded or casted into a material 13 with an electrical insulating property and/or with a non-corroding quality and/or with a heat conductive property to protect the ring segment shaped stator segment 10, in particular the laminated sheet package 11 and the stator windings 12 against damages and corrosion particularly under rough ambient environmental conditions. Preferably the material 13 comprises all three mentioned properties. But the material 13 can also have only one or two of the mentioned properties subject to the range of application of the ring segment shaped stator segment 10. Appropriate materials 13 are resins, e.g. casting resins, an epoxy resin as well as an epoxy casting resin. In case of the present embodiment of the invention the moulding or casting material 13 is an epoxy casting resin. A respective mould or casting mould is used for sealing the ring segment shaped stator segment 10. To improve the properties of the material 13 and the resins respectively it is possible to add materials to the resins, e.g. silicon dioxide ($SiO_2$) for improving the heat conduction and/or glass fibres for avoiding cracking in the resin 13.

In case of the present embodiment of the invention the ring segment shaped stator segment 10 additionally comprises means for cooling the ring segment shaped stator segment 10 during operation. In a first embodiment of the invention the means for cooling comprises an external surface of the ring segment shaped stator segment 10 having a heat dissipation property. This surface can be e.g. an external surface 14 of the moulded or casted ring segment shaped stator segment 10, in particular when the material 13 has a sufficient good heat conducting property. Additionally or alternatively the external surface can be a surface 15 of a material which is different from the moulding or casting material, has a heat dissipation property and which is attached to the moulding or casting material 13 of the ring segment shaped stator segment 10. Appropriate materials are e.g. metallic materials. In case of the present embodiment of the invention an aluminium sheet 16 is bonded with the ring segment shaped stator segment 10, in particular with a part of the surface 14. Thus heat generated during the operation of the direct drive generator 6 and the stator 9 respectively is conducted by the moulding or casting material 13 to the surface 14 and/or the aluminium sheet 16 and the surface 15 respectively and dissipated thereof to the ambience.

In a second embodiment of the invention the means for cooling of the ring segment shaped stator segment 10 comprise at least one heat conducting element. In case of the present embodiment of the invention the ring segment shaped stator segment 10 comprises a plurality of heat conducting elements in form of aluminium casting elements 17. Each aluminium casting element 17 is arranged adjacent to a stator winding 12 preferably adjacent to a winding head 18 of a stator winding 12 or extends as in the present case through the opening of a winding head 18 of a stator winding 12. Each aluminium casting element 17 is integrated in the moulding or casting material 13 and leads to a surface of the ring segment shaped stator segment 10 which surface acts as a heat sink and has heat dissipation property. Therefore an aluminium casting element 17 leads preferably to the surface 14 or the aluminium sheet 16 and the surface 15 respectively. Each aluminium casting element 17 provides a direct pathway for the heat generated during operation to an external surface 14 or 15. The aluminium casting elements 17 are primarily advantageous adjacent to the winding heads 18 of the stator windings 12 where the distance to an external surface is comparatively far.

Figure 4:
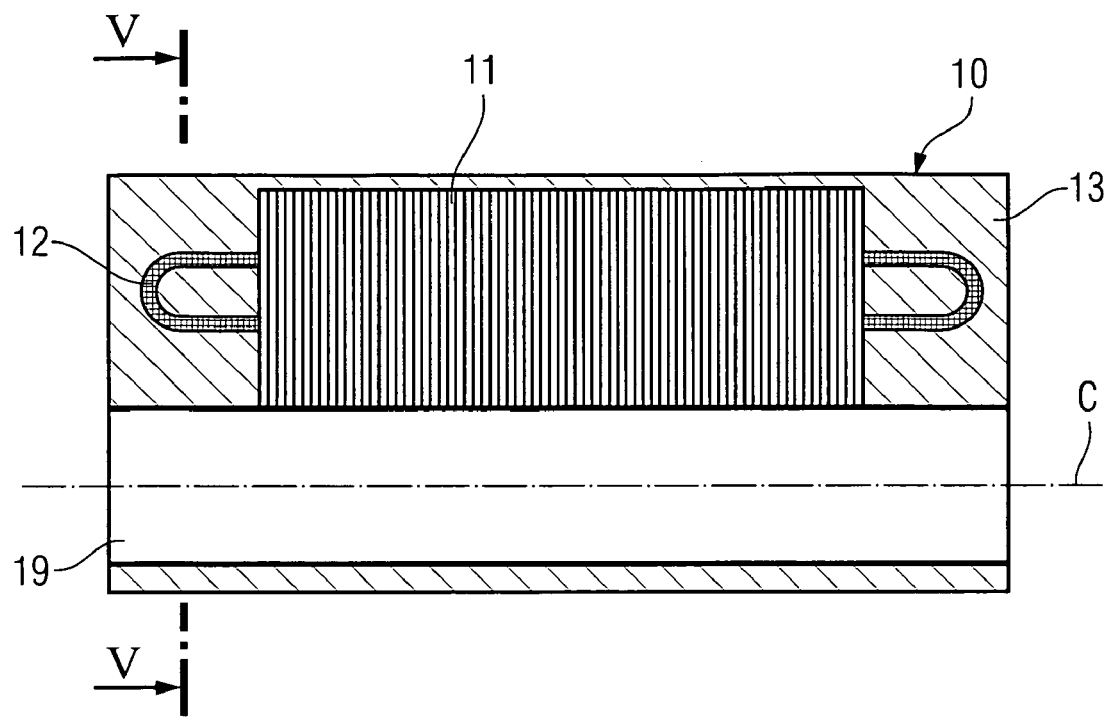
FIG. 4 shows an axial sectional view of another stator segment of a stator of a generator for a wind turbine and FIG. 5 shows the sectional view of the stator segment of FIG. 4 in the direction of the arrows V.
Figure 5:
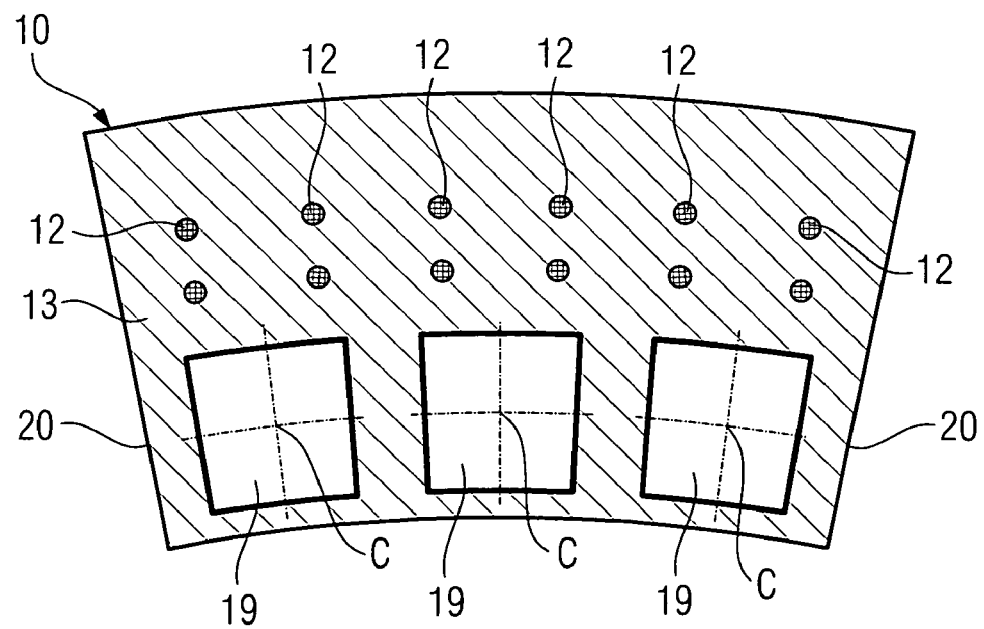

The FIGS. 4 and 5 show another ring segment shaped stator segment 10 which belongs to another not shown direct drive generator of a wind turbine. A component of the ring segment shaped stator segment 10 of the FIGS. 4 and 5 which corresponds to a component of the ring segment shaped stator segment 10 of the FIGS. 2 and 3 is provided with the same reference number.

In the embodiment of the FIGS. 4 and 5 the means for cooling of the ring segment shaped stator segment 10 comprises at least one conduit 19, e.g. in form of a jacket or pipe, for a cooling medium which at least one conduit 19 is integrated in the moulding or casting material 13. In case of the present embodiment of the invention the ring segment shaped stator segment 10 comprises three axially extending conduits, thus the centre axes C of the conduits 19 are substantially parallel to the centre axis A of the generator. But the conduits can also have another course, e.g. a meander shaped course etc. In the present case the conduits 19 have a square cross section, but the conduits 19 can also have a round, oval or another cross section. When a cooling medium like a cooling gas, a cooling oil or simply water is guided through the conduits 19 the ring segment shaped stator segment 10 can be actively cooled.

Preferably all conduits 19 of all ring segment shaped stator segments 10 are in a not shown manner connected to a closed circulation comprising besides the conduits 19 further connection conduits, at least one heat exchanger and at least one pump for actively pumping the cooling medium through the conduits.

As mentioned above the stator 9 comprises in case of the present embodiment of the invention a plurality of substantially identical ring segment shaped stator segments 10 which form substantially the ring shaped stator 9 when the face side 20 of one ring segment shaped stator segment 10 is arranged on the face side 20 of another ring segment shaped stator segment 10 and so on.

According to FIG. 1 the stator 9 is arranged around the rotor arrangement 7. Thus the air gap between the stator 9 and the rotor and the rotor arrangement 7 respectively is located on the inside of the stator 9 and each ring segment shaped stator segment 10 of the stator 9 respectively.

When a plurality of ring segment shaped stator segments 10 of the FIGS. 4 and 5 are arranged in such a way that the face side 20 of one ring segment shaped stator segment 10 is arranged on the face side 20 of another ring segment shaped stator segment 10 and so on they form also substantially a ring shaped stator or stator arrangement, wherein the conduits 19 are arranged at the inner side. In this case the air gap is located on the outside of the stator or stator arrangement and thus the stator or stator arrangement is arranged inside of the corresponding rotor or rotor arrangement. When the conduits are located at the outer side of the ring segment shaped segments the air gap is located on the inside of the stator or stator arrangement and thus the stator or stator arrangement is arranged around the corresponding rotor or rotor arrangement. In this case the bend of the ring segment shaped stator segments is changed.

By the way a ring segment shaped stator segment 10 can comprise as means for cooling at least one conduit 19, at least one surface 14, at least one surface 16 and at least one heat conducting element 17. But a ring segment shaped stator segment 10 can comprise also only one or two or three different means for cooling.

The invention claimed is:

1. A stator arrangement of a generator for a wind turbine, comprising:
a plurality of stator segments substantially forming the stator of the generator, each stator segment:
includes a stator winding and a laminate stack of sheets, and
is moulded or casted into a material with an electrical insulating property and with a non-corroding quality and with a heat conductive property,
includes a rotor facing side such that when installed the rotor facing side faces a rotor of the wind turbine, and an opposite side which faces opposite from the rotor facing side,
wherein at least one of the plurality of stator segments comprises means for cooling for at least cooling of the respective stator segment, and
wherein the means for cooling the respective stator segment comprises at least one conduit for a cooling medium, the conduit extends the full length of the respective stator segment,
the at least one of the plurality of stator segments comprises:
a top portion extending along the opposite side, the stator winding and the laminate stack are arranged in the top portion,
a bottom portion extending along the rotor facing side, and
a middle portion between the top portion and the bottom portion, the conduit is arranged in the middle portion,
wherein the top, the middle and the bottom portions extend the full length of the respective stator arrangement.

2. The stator arrangement according to claim 1, wherein each stator segment is a ring segment shaped stator segment.

3. The stator arrangement according to claim 1, wherein the material is selected from the group consisting of a resin, a casting resin, an epoxy resin and an epoxy casting resin.

4. The stator arrangement according to claim 1, wherein the resin comprises silicon dioxide and/or glass fibres.

5. The stator arrangement according to claim 1, wherein the conduit is a jacket or a pipe.

6. The stator arrangement according to claim 1, wherein the cooling medium is a cooling gas, a cooling oil or water.

7. The stator arrangement according to claim 1, wherein the means for cooling the respective stator segment comprises an external surface of the respective stator segment having a heat dissipation property.

8. The stator arrangement according claim 7, wherein the external surface is a surface of the moulding or casting material of the respective stator segment.

9. The stator arrangement according claim 7, wherein the external surface is a surface of a material having a heat dissipation property and being attached to the moulding or casting material of the respective stator segment.

10. The stator arrangement according to claim 1, wherein the means for cooling the respective stator segment comprises a heat conducting element arranged orthogonally to the rotor facing side and which extends to a opposite side of the respective stator segment.

11. The stator arrangement according to claim 10, wherein the heat conducting element is arranged adjacent to the stator winding.

12. The stator arrangement according to claim 10, wherein the heat conducting element is arranged adjacent to a winding head of the stator winding or extends through the opening of a winding head of the stator winding and leads to a surface of the respective stator segment.

13. The stator arrangement according to claim 10, wherein the heat conducting element is an aluminium casting element integrated in the moulding or casting material of the respective stator segment.

14. The stator arrangement according to claim 1, wherein the means for cooling the respective stator segment is connected to the heat exchanger.

15. A direct drive generator for a wind turbine, comprising:
a rotor arrangement; and
a stator arrangement according to claim 1.

16. A wind turbine, comprising:
a stator arrangement according to claim 1.

17. The stator arrangement according to claim 5, wherein the jacket or the pipe is open on both sides of the stator segment.

18. The stator arrangement according to claim 1,
wherein at least one of the plurality of stator segments comprises a heat conducting element arranged orthogonally to the rotor facing side and which extends to a opposite side of the respective stator segment.

* * * * *